United States Patent [19]
Holenstein et al.

[11] Patent Number: 6,065,345
[45] Date of Patent: May 23, 2000

[54] METHOD FOR MONITORING THE CONDITION OF A MECHANICAL SEAL

[75] Inventors: Anton Holenstein, Pfungen; Janusz Milek, Zürich; Bernhard Birchler, Wallisellen, all of Switzerland

[73] Assignee: Sulzer Pumpen AG, Winterthur, Switzerland

[21] Appl. No.: 09/119,700

[22] Filed: Jul. 21, 1998

[30] Foreign Application Priority Data

Jul. 31, 1997 [EP] European Pat. Off. .............. 97810549

[51] Int. Cl.⁷ .................................................. G01M 19/00
[52] U.S. Cl. ................................................ 73/660; 73/579
[58] Field of Search ........................... 73/801, 579, 587, 73/592, 660, 40, 46, 49.3

[56] References Cited

U.S. PATENT DOCUMENTS

| | | | |
|---|---|---|---|
| 3,958,451 | 5/1976 | Richardson | 73/644 |
| 4,051,717 | 10/1977 | Miller | 73/46 |
| 4,748,850 | 6/1988 | Kataoka | 73/660 |
| 4,802,458 | 2/1989 | Finsterwald et al. | 600/454 |
| 5,239,864 | 8/1993 | Pragenau | 73/118.1 |

*Primary Examiner*—Max Noori
*Attorney, Agent, or Firm*—Townsend and Townsend and Crew

[57] ABSTRACT

In a method for monitoring the condition of a mechanical seal in an apparatus provided with a rotating part, in particular in a pump which has a rotating shaft for the forwarding of a fluid, the sound emission of the seal is continually measured at discrete times in the operating state of the apparatus and at least one statistical characteristic value is won from the acoustic signals. The analog acoustic signals are converted prior to the determination of the statistical characteristic value into analog demodulated signals, the maximum frequency of which is less than about 50 kHz.

12 Claims, 3 Drawing Sheets

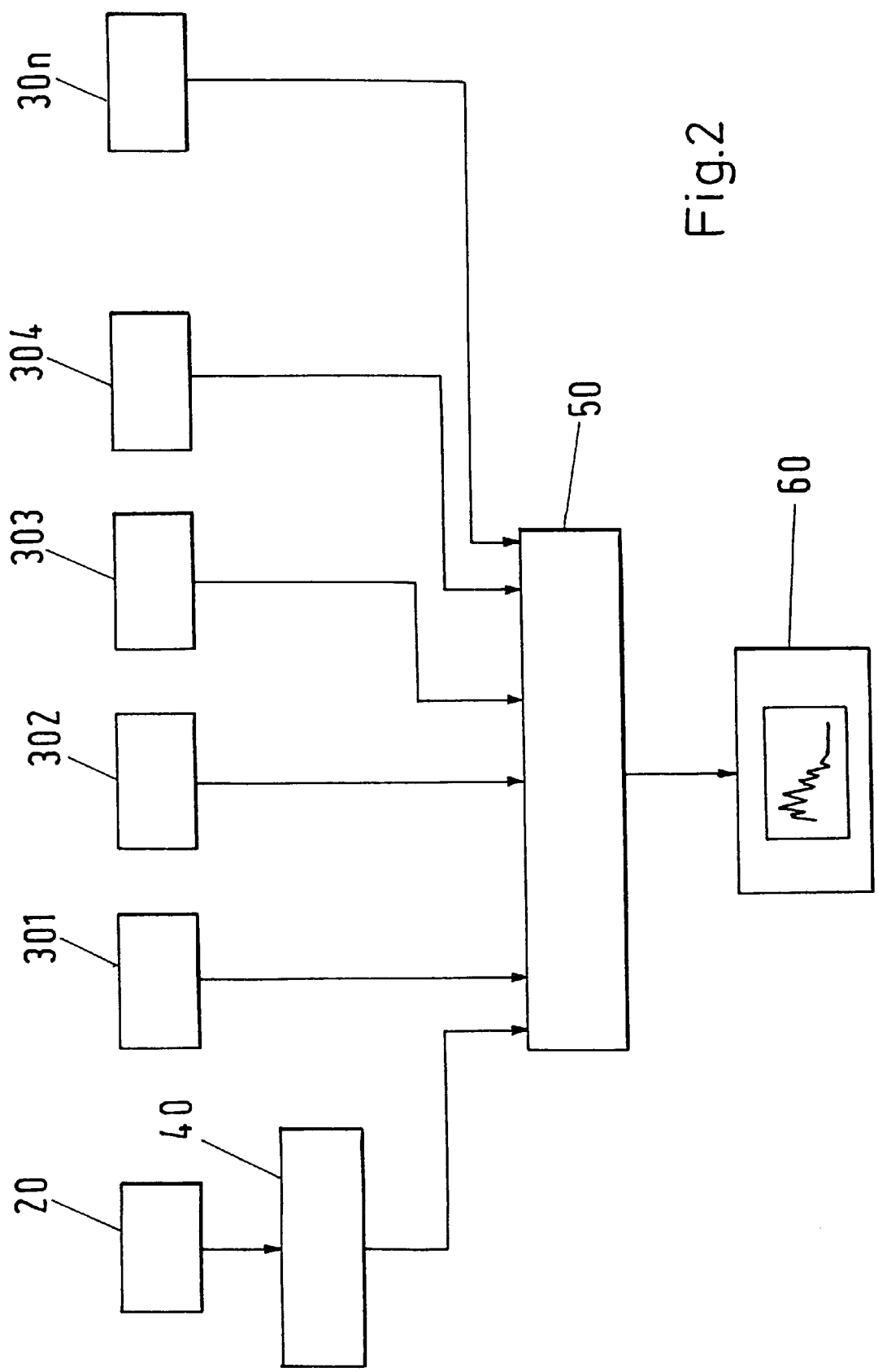

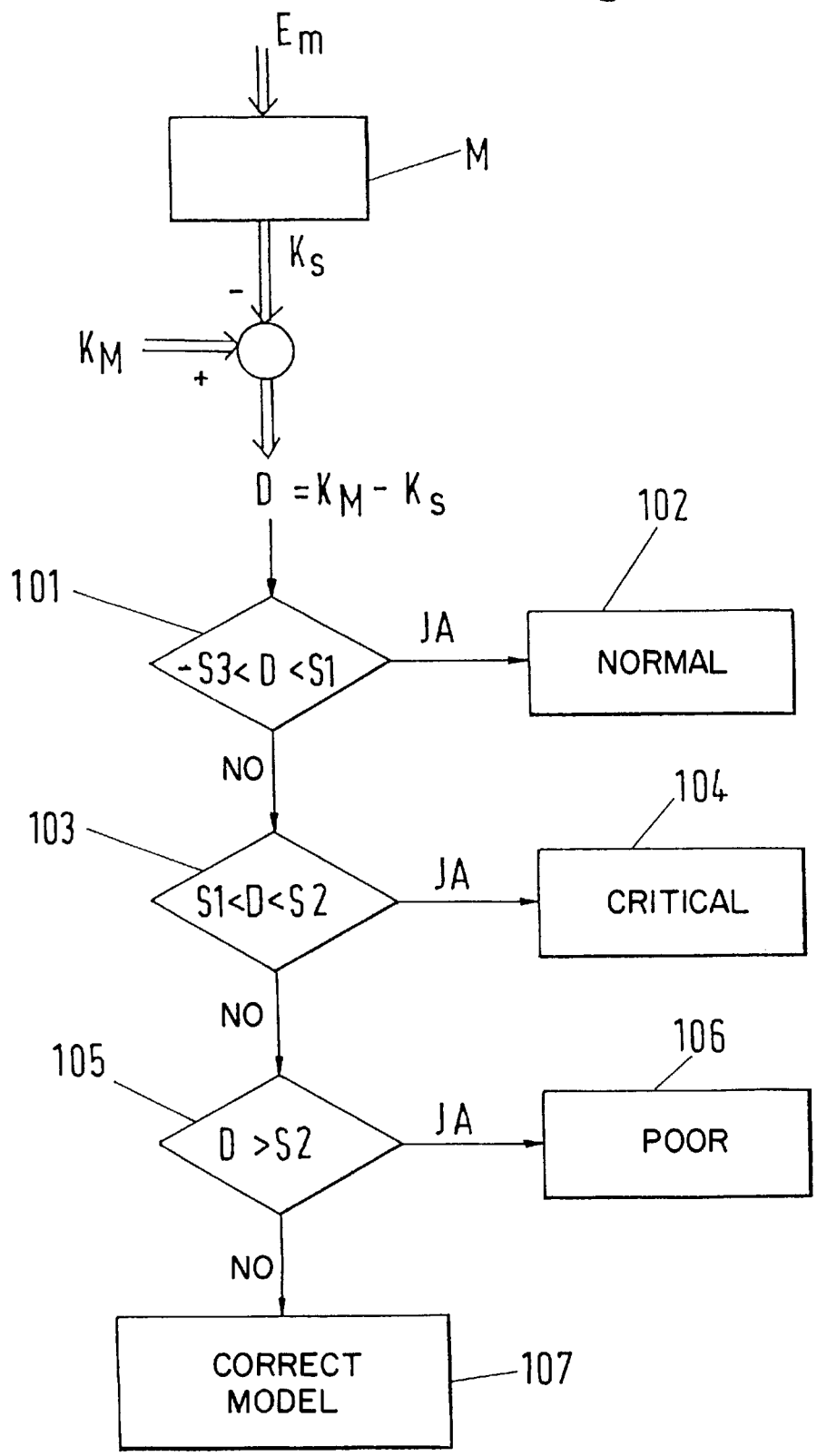

METHOD FOR MONITORING THE CONDITION OF A MECHANICAL SEAL

BACKGROUND OF THE INVENTION

1. Field Of The Invention

The invention relates to a method for monitoring the condition of a mechanical seal in an apparatus provided with a rotating part, in particular a pump, with a rotating shaft for forwarding fluid in which sound emission of the seal is continually measured in the form of analog acoustic signals at discrete times by means of a sound sensor.

2. Description of the Prior Art

Mechanical seals are, for example, used in pumps for sealing the shafts in order to avoid an escape of the fluid to be forwarded at the shaft which drives the pump wheel. Such seals are typically designed in two parts as sliding seals or as sliding ring seals, with the one part being connected in a rotationally fixed manner to the shaft, which rotates in the operating state, and the other part being secured against rotation with respect to the pump housing so that the two parts slide along one another. Normally, a sliding seal of this kind is kept in a coolant in order to dissipate the frictional heat produced. This coolant can either be the fluid to be forwarded, or a separate coolant can be provided. The coolant serves as a lubricant at the same time whereby it forms a lubricating film between the two parts of the seal sliding relative to one another, which is essentially for the functioning of the seal and its working life.

As a result of their high mechanical loading, mechanical seals of this kind represent one of the critical elements in pumps such as are, for example, used in refineries, in large chemical plants, or as feed water pumps in power plants. A failure of seals of this kind, for example, through breaking away of the lubricating film or through dry running, leads to unexpected failures of the pump and thus, often to an unexpected standstill of the entire plant. The production losses caused thereby are extremely disadvantageous from the economical point of view. However, it is also desirable for ecological and security reasons for a sudden failure of the pump as a result of wear, malfunction, or damage to a seal to be avoided as far as possible. There is therefore a need to be able to continually monitor or to assess the condition of such seals in the operating state. This is, however, made difficult due to the fact that it is often not possible to perform a visual monitoring of the seal or to install suitable sensors directly on the sliding parts of the mechanical seal with a justifiable cost and complexity.

It is known, e.g. from the German patent specification DE-C-37 07 524, to test the sliding conditions of a seal of this kind on the basis of the HF sound emission in the frequency range from 100 kHz up to at least 1 MHz. A method of this kind is based on the fact that the sound emission of the seal changes with the condition of the lubricating film. Essential for the procedure proposed in DE-C-37 07 524 is that the high frequency vibration sensor is arranged at the outer side of the machine housing in order to pick up the sound emission, i.e. is not in direct contact with the shaft seal. In accordance with the teaching of DE-C-37 07 524, the effective value, the energy value or a count value is determined from the signal derived from the acoustical measurement. This value is accumulated over a certain time interval and a frequency or amplitude distribution is derived therefrom. An assessment is then made whether the determined distribution corresponds to a normal operation of the seal.

DE-C-37 07 524 teaches the conversion of the output signal of the high frequency vibration sensor into a digital signal by means of a high speed A/D converter. In order to perform an error free digitalization at a specified maximum frequency of two MHz, the A/D converter must operate at a clock frequency of at least four MHz. High speed A/D converters which operate at such a high digitalization rate are highly specialized devices which are manufactured with high cost and complexity of the device and accordingly represent cost intensive components. The design of the apparatus for the signal processing must also be able to operate sufficiently rapidly. Taking into consideration that, as rule, a plurality of mechanical seals must be subjected to a continual and reliable monitoring in large industrial plants, the use of these high speed A/D converters and these high clock frequencies is disadvantageous from the economical point of view. They contradict the desire to achieve a cost-favorable monitoring of mechanical seals which is as economical as possible.

SUMMARY OF THE INVENTION

Starting from this prior art, it is an object of the invention to provide a method for the monitoring of the condition of a mechanical seal in an apparatus which is provided with a rotating part which enables an economical and reliable assessment of the sliding condition of the seal based on measurements of the sound emission. Using the method, it should be possible to carry out a continual and simple monitoring of the apparatus. Furthermore, the method should enable a reliable assessment of the condition of the seal even in variable operating states of the apparatus. It is especially an object of the invention to propose an economical and reliable method of this kind for the monitoring of the condition of a mechanical seal in a pump for the forwarding of a fluid. The method should enable a reliable assessment of the sliding condition of the seal, in particular, in variable operating conditions of the apparatus.

The method in accordance with the invention, thus, the sound emission of the seal, is continually measured at discrete times in the form of analog acoustic signals by means of a sound sensor in the operating state of the apparatus. At least one statistical characteristic value is won from the acoustic signals which is used for the assessment of the sliding condition of the seal. The method in accordance with the invention is characterized in particular, wherein the analog acoustic signals are converted prior to the determination of the statistical characteristic value into analog demodulated signals, the maximum frequency of which is less than about 50 kHz, but preferably not more than about 20 kHz.

Through the conversion, in accordance with the invention, of the analog acoustic signals measured by the sound sensor into analog demodulated signals, the maximum frequency of which is less than about 50 kHz, no technically complicated and expensive high speed A/D converters are required for the method in accordance with the invention. The maximum frequency of the analog demodulated signals is preferably not more than about 20 kHz. In this manner, simple standard components which are sufficiently well known per se from conventional audio systems, such as the A/D conversion and statistical evaluation, can be used for the subsequent further signal processing. This means a considerable cost reduction and makes the method in accordance with the invention particularly simple and economical from the point of view of the apparatus required.

Surprising here is the observation that the demodulated analog signals, which in principle represent a highly reduced set of data relative to the originally measured acoustic signals, are sufficient in regard to their information content in order to enable a reliable assessment of the sliding condition of the seal.

Furthermore, it is advantageous that the amount of the data to be subsequently further processed is significantly reduced through the conversion of the acoustic signals into demodulated signals. The storage capacity required for the data is namely reduced, the computational cost and complexity for the evaluation decrease significantly, the processing time is shortened and the result of the assessment is available much more rapidly, quasi on line.

The sound emission of the seal is preferably measured in the frequency range from about 100 kHz to about one MHz because this range is particularly favorable and highly meaningful.

It is also advantageous if operating parameters are continually measured at discrete times by means of corresponding sensors, with at least the entry temperature of a coolant for the cooling of the seal as well as the speed of rotation of the rotating part of the apparatus, for example, the shaft of the pump, being measured as operating parameters. The operating parameters are at least partially used for the assessment of the sliding condition of the seal.

These measures are particularly advantageous in order to reliably assess the condition of the seal even when the operating state of the apparatus or the pump is variable, for example, when the speed of rotation of the pump changes. Changes of the operating state of this kind, such as e.g. changes in the speed of rotation, changes in the power, temperature variations of the coolant, a change in the pressure in the fluid to be forwarded (at the high pressure side or at the low pressure side) can namely produce changes in the sound emission of the seal without the sliding condition of the seal having deteriorated. As a result of the measurement of such operating parameters or their changes, changes in the sound emission of the seal which are based on changes of the operating state of the apparatus or pump can be distinguished from those which result from a significant change in the sliding condition of the seal.

It is particularly advantageous for this discrimination that at least the entry temperature of the coolant for the cooling of the seal, as well as the speed of rotation of the rotating part of the apparatus, or the shaft of the pump, are registered as operating parameters.

The conversion of the analog acoustic signals into analog demodulated signals is preferably done by means of a peak value detector because it is hereby ensured that the essential extreme values of the acoustic signals are measured in the demodulation.

It can also be advantageous to measure the exit temperature of the coolant for the cooling of the seal in addition to the entry temperature as a further operating parameter and to use it for the assessment of the sliding condition of the seal. The knowledge of the entry and the exit temperatures of the coolant namely enables at least an estimate of the amount of heat produced by the seal to be made. For example, a significant increase in this amount of heat can indicate that the lubricant film between the seal parts is at least incomplete (e.g. in the event of vaporization) and that the seal is approaching the condition of dry friction.

A preferred further development of the method in accordance with the invention consists, by means of a model for which at least some of the operating parameters determined serve as input parameters, at least one desired characteristic value is determined for the sound emission of the seal which takes the current operating state of the apparatus, for example of the pump, into consideration. This characteristic value is used for the assessment of the sliding condition of the seal. Consequently, using this model, a determination can be made for each characteristic value which is won from the acoustic signals of the desired characteristic value corresponding to it. This characteristic value provides the value which the corresponding characteristic value determined from the acoustic signals should have when the sliding condition of the seal lies in the normal range in the current operating state. The desired characteristic value thus represents a kind of reference which is typical for the normal sliding state and which takes the current operating state of the apparatus or the pump into consideration in addition. This model also has the advantage that the current operating state can be taken into consideration more exactly when assessing the sliding condition of the seal.

As further operating parameters in the method in accordance with the invention, one or more of the following measurement values can, e.g. be additionally determined: the temperature of the housing of the apparatus, for example, of the pump, the temperature of the fluid, the power output of the apparatus, the amount forwarded by the pump, the pressure in the fluid at the high pressure side and/or at the low pressure side.

BRIEF DESCRIPTION OF THE DRAWINGS

FIG. 2 is a block diagram for illustrating an exemplary embodiment of the method in accordance with the invention, and FIG. 3 is a diagram to explain a further development of the exemplary embodiment of the method in accordance with the invention.

DETAILED DESCRIPTION OF THE PREFERRED EXEMPLARY EMBODIMENTS

Figure 1:
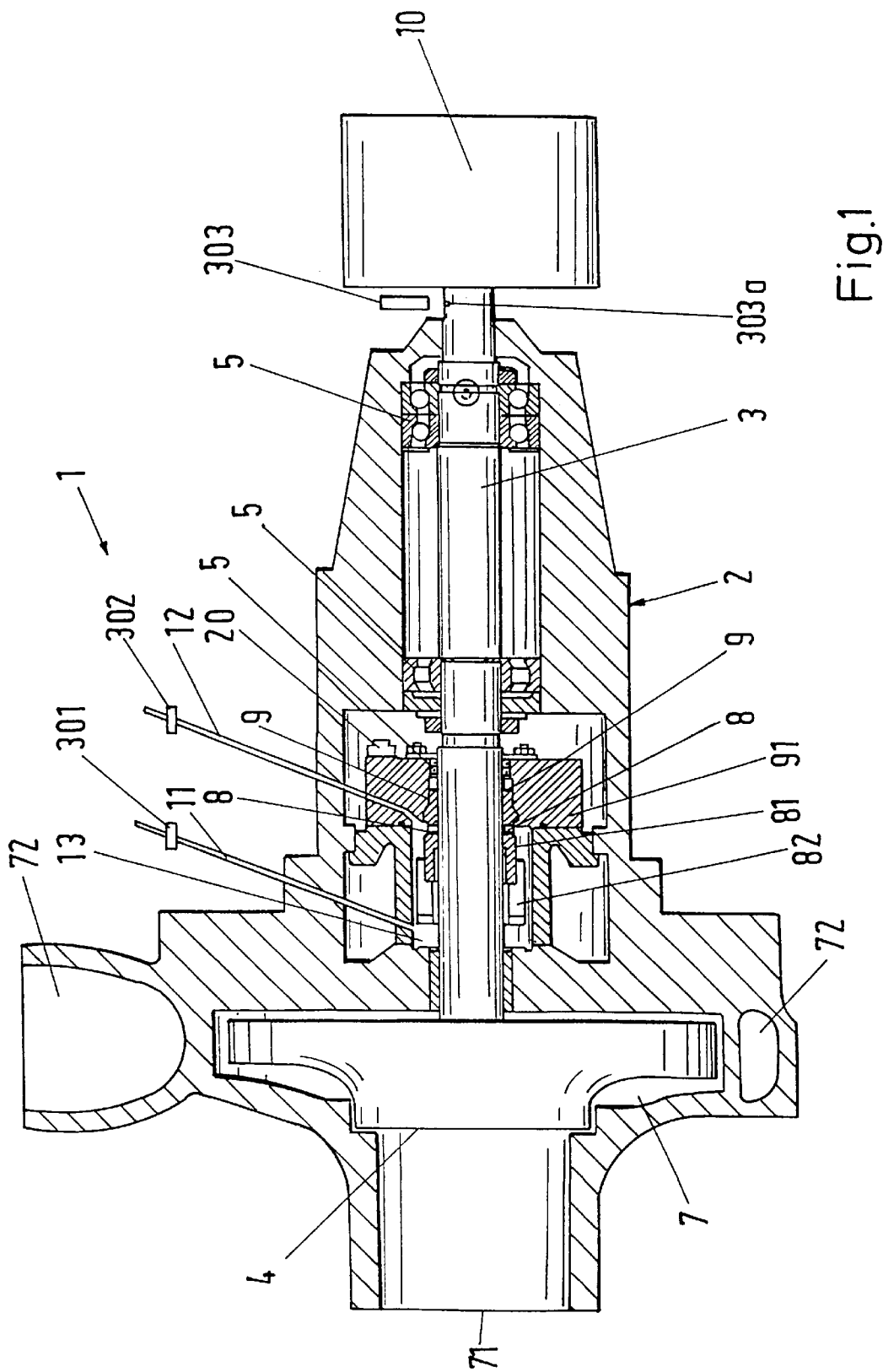
FIG. 1 shows the essential parts of a pump with a mechanical seal in a highly schematic sectional illustration.

In the following, the method in accordance with the invention will be explained with exemplary character with reference to uses in which the mechanical seal to be monitored is part of a pump for the forwarding of a fluid. It is self evident that the invention is not restricted to such cases. The following explanations hold quite generally in an analogous manner for the monitoring of the condition of a mechanical seal in an apparatus which is provided with a rotating part, with the mechanical seal forming a sealing connection between the rotating part of the apparatus and a component of the apparatus which is not rotating or is rotating at a different speed of rotation. Such apparatuses can, for example, be flow machines such as e.g. turbines, blowers, compressors or also drive apparatuses with rotating shafts, e.g. motors. Mechanical seals of this kind are typically designed in two parts, with the one part being connected in a rotationally fixed manner to the rotating part of the apparatus and the other part to a component of the apparatus which is not rotating or is rotating at a different speed of rotation so that the two parts slide along one another during the operation of the apparatus.

FIG. 1 shows in a highly schematized sectional representation, the essential parts of a pump, which serves in the following as a representative example for an apparatus provided with a rotating part. The pump as a whole is provided with the reference numeral 1. It has a pump housing 2, in the inner space of which a pump chamber 7 is provided, and a shaft 3 which drives a pump wheel 4 which is arranged in the pump chamber 7 for the forwarding of a fluid. The shaft 3 is journalled in a plurality of bearing devices 5 in the interior of the pump housing 2 and is driven by a motor 10. During operation the fluid is sucked into the pump chamber 7 through an induction opening 71 and leaves it through an outlet which is designed in this example as a scroll passage 72. In the interior of the pump housing 2 the shaft 3 is provided with a mechanical seal which seals the pump chamber 7 relative to the outer space.

The mechanical seal comprises a sliding ring 8 and a stator 9, each of which surrounds the shaft 3. The sliding ring 8 and the stator 9 form the two parts of the mechanical seal which slide against one another during operation. The sliding ring 8 is mounted in a sliding ring mount 81 which is spring loaded in the axial direction of the shaft 3 and is mounted so as to be rotationally fixed in a sliding ring holder 82. Through this spring loading in the axial direction, the sliding ring 8 is pressed against the stator 9. The sliding ring holder 82 is firmly connected to the shaft 3, and is, for example, shrunk onto the latter, so that when the shaft 3 rotates the sliding ring holder 82, the sliding ring mount 81 and the sliding ring 8 rotate along with it. The stator 9 is firmly connected to a holder 91 which is fixed with respect to the pump housing 2.

During the operation of the pump 1, the sliding ring 8 and the stator 9 of the mechanical seal are cooled by means of a coolant which at the same time serves as a lubricant between the sliding ring 8 and the stator 9. This coolant can be identical to the fluid to be forwarded and, for example, arrive at the seal from the pump chamber 7. A coolant which is different from the fluid to be forwarded can however also be used. In the design of the pump 1 in accordance with the illustration in FIG. 1, a separate supply line 12 and a separate extraction line 11 can be provided for the coolant, each of which connects the outer space of the pump 1 to a coolant chamber 13 which is located in the interior of the pump housing 2 and which substantially surrounds the mechanical seal. The coolant enters the coolant chamber 13 in the pump housing 2 through the supply line 12, contacts the mechanical seal there and leaves the coolant chamber 13 through the extraction line 11.

A sound sensor 20 is arranged on the holder 91 in the interior of the pump housing 2 and measures the sound emission of the mechanical seal in the operating state of the pump 1 in the frequency range from e.g. about 100 kHz to about one MHz in the form of analog acoustic signals. It is known, e.g. from the already mentioned DE-C-37 07 524, that this frequency range is particularly well suited for the monitoring of the sliding condition of the mechanical seal on the basis of its sound emission. The sound sensor 20 is located in the immediate vicinity of the mechanical seal in order to measure the sound emitted by it with as little disturbance as possible. The sound sensor 20, however, has no direct bodily contact with the sliding ring 8 or the stator 9 because a direct contact would be realized—if at all—only with considerable cost and complexity. Naturally, the sound sensor can also be arranged at places other than those shown in FIG. 1, e.g. at an inner or outer wall of the pump housing 2.

Moreover, still further sensors 301, 302, 303 are provided, by means of which operating parameters of the pump 1 can be measured. The term "operating parameters" is used here to means those directly or indirectly measurable parameters which are useful for characterizing the operating state of the apparatus or of the pump 1. In the concrete case of the pump, the term operating parameter comprises, for example, the following parameters: the speed of rotation of the shaft 3, the entry and exit temperature of the coolant, the temperature of the pump housing 2, the temperature of the fluid to be forwarded, the power output and the amount forwarded by the pump 1, the pressure in the fluid at the low pressure side and at the high pressure side, the flow rate and speed of the coolant, the pressure of the coolant in the coolant chamber 13 and the heat capacity of the coolant. In principle, all these operating parameters and possibly yet further ones are suitable for characterizing the operating state of the pump 1.

In accordance with a preferred exemplary embodiment of the invention, at least the entry temperature of the coolant and the speed of rotation of the rotating part of the apparatus or of the shaft 3 of the pump 1 are measured as operating parameters and used for the assessment of the sliding condition of the seal. The measurement of the operating parameters takes place, for example, once per minute.

For the measurement of the operating parameters in the example shown in FIG. 1, an entry temperature sensor 302 and an exit temperature sensor 301, for the measurement of the respective inlet and exit temperatures of the coolant, as well as a speed of rotation sensor 303 for the determination of the speed of rotation of the shaft 3 are provided. The inlet temperature of the coolant is that temperature which the coolant has before it enters into the coolant chamber 13. The exit temperature is that which the coolant has after leaving the coolant chamber 13. For the determination of the speed of rotation, a marking 303a on the shaft 3 can, for example, be provided in a manner which is known per se and which triggers a pulse in the speed of rotation sensor 303 each time it passes the latter.

FIG. 2 shows a block representation for the illustration of an exemplary embodiment of the method in accordance with the invention. The sound sensor 20 measures the sound emission deriving from the surfaces of the mechanical seal as they slide along one another in the form of analog acoustic signals which have a bandwidth of about one MHz. These analog acoustic signals are fed to a demodulation device 40 which converts the acoustic signals into analog demodulated signals, the maximum frequency of which is less than about 50 kHz. The analog demodulated signals are then fed to a computation and evaluation device 50, where they are first transformed into digital signals by means of an A/D converter (Analog/Digital converter) which are stored for further processing. The conversion of the analog acoustic signals into analog demodulated signals is preferably done by means of a peak value detector. The latter substantially forms the envelope of the high frequency acoustic signal so that the high frequency part—that is, the temporally rapidly varying part—of the acoustic signals is filtered out, so to speak. Through this kind of demodulation it is ensured that the important extreme values of the acoustic signal are registered during the demodulation and the information concerning them is contained in the analog demodulated signals. The maximum frequency of the demodulated signals can be predetermined during this process. It is less than about 50 kHz and preferably not greater than 20 kHz, for example 10 kHz, because in this manner, the subsequent further processing of the demodulated signals can be carried out by means of standard components such as are sufficiently known from the technology of commercial audio systems. Thus, for example, if the maximum frequency of the demodulated signals is restricted to about 10 kHz, a standard A/D converter with a digitalization rate of, for example, 25 kHz can be used for the subsequent digitalization without errors arising in the digitalization. Surprising here is the observation that in spite of the relatively narrow restriction of the demodulated analog signals with respect to their frequency, their information content is sufficient in order to enable a reliable assessment of the sliding condition of the seal.

The operating parameters which are continually measured by the entry temperature sensor 302, the exit temperature sensor 301, and the speed of rotation sensor 303 are likewise fed to the computation and evaluation device 50 and stored there as digital quantities. Naturally, further measurement values such as are mentioned further above can also be determined as operating parameters by means of corresponding sensors 304–30n and fed to the computation and evaluation device 50. The conversion of the operating parameters into digital values can take place e.g. in the computation and evaluation device 50, or sensors can be used which already supply the corresponding operating parameter in digital form.

The measurement of the sound emission of the mechanical seal by means of the sound sensor 20 takes place, for example, in the form of successive individual measurements, in each of which the sound emission is determined as a function of time. Every such individual measurement extends, for example, over a time interval in which the shaft carries out a plurality of, e.g. up to tens of, rotations. The temporal separation at which the successive individual measurements are performed can be selected in accordance with the apparatus and the operating state. A typical value is, for example, one individual measurement per minute. The analog acoustic signals belonging to an individual measurement are, as explained above, converted into analog demodulated signals, digitized and stored in a digital data set in the computation and evaluation device 50. The operating parameters measured by the sensors 301–30n during the individual measurements are stored in the computation and evaluation device 50 in a form associated with the individual measurements, which means that for each of the digital data sets which are derived from the individual measurements it is known which values the measured operating parameters had during the corresponding individual measurement. Should one of the operating parameters change significantly during the individual measurement, then e.g. the average value of this operating parameter over the time interval of the individual measurement or an extreme value which this operating parameter had taken on during the individual measurement can be associated with the corresponding digital data set.

An important significance is placed on the measurement of the speed of rotation as an operating parameter. If the apparatus or the pump does not operate at a constant speed of rotation, then changes in the speed of rotation can produce clear changes in the sound emission without the sliding condition of the seal having noticeably deteriorated. In order not to erroneously assess thus caused changes in the sound emission as an abnormal sliding condition, the momentary speed of rotation at which the sound emission was measured must be known. In addition, the measurement of the speed of rotation can be used as a trigger signal, which is advantageous for the evaluation of the digital data sets. Thus, for example, it is possible, on the basis of the speed of rotation measurements, to subdivide an individual measurement, which typically extends over a plurality of rotations of the shaft 3, or respectively associated data set into individual time segments in such a manner that each time segment corresponds to one rotation of the shaft 3. In this manner, the time dependence of the individual measurement, or of the associated digital data set, can in principle be transformed into an angular dependence. If e.g. a peak occurs in a time segment which corresponds to one rotation of the shaft, it can then be determined whether this peak occurs again at the same time in the following rotations, which means at the same relative position of the two surfaces of the seal which slide along one another. Periodically arising signals, such as can be caused e.g. by grooves in the sliding surfaces, can be thereby distinguished from non-periodic ones, such as can be caused, e.g., by the breaking out of small particles from the sliding surfaces.

An important significance is also placed on the measurement of the entry temperature of the coolant, since it influences the temperature of the mechanical seal, which in turn has an influence on the sound emission of the seal. The entry temperature of the coolant is often subject to fluctuations which can have an effect on the sound emission of the seal. It is therefore important that the entry temperature of the coolant is also measured as an operating parameter. The reliability of the assessment of the sliding condition of the seal is thereby increased.

By means of the digital data sets determined from the analog demodulated signals, at least one statistical characteristic value, which is used for the assessment of the sliding condition of the seal, is won in the computation and evaluation device 50. There are numerous possibilities for the type of the statistical evaluation of the digital data sets and for the kinds of the statistical characteristic values which are determined, of which several will be mentioned in the following with exemplary character. It is, for example, possible to statistically evaluate each of the digital data sets by itself as a whole. Furthermore, several of the digital data sets can first be combined and then evaluated. It is also possible in particular, as already mentioned above, to subdivide a digital data set into time segments in such a manner that each time segment corresponds to a rotation of the shaft 3, to sum up the signals belonging to the individual time segments and to evaluate the signal resulting therefrom, which thus corresponds temporally to one revolution of the shaft 3. A time signal of this kind is designated in the following as a rotation signal. By way of example the following are suitable as statistical characteristic values which are won by means of an evaluation are, e.g., the temporal average value of a digital data set or of a combination of a plurality of digital data sets or of a rotation signal, the effective value, the RMS value (root mean square value), the maximum or minimum peak value, the skew, the kurtosis, burst factors, crest factors, the counting rate of how often a predetermined limiting value is exceeded, or other statistical parameters which are known per se. The statistical characteristic value or values is or are subsequently passed on to an output unit 60 and displayed there and/or plotted or stored. If now a significant change in one or more of the statistical characteristic values arises during the course of the operation of the pump, then a test is first made on the basis of the determined operating parameters of whether this change can have been caused by a change of the operating state of the pump, e.g. through a change in the speed of rotation or a change in the entry temperature of the coolant. If this is out of the question, or if at least one of the characteristic values exceeds a threshold value determined from calibration measurements, then the sliding condition of the seal is assessed as critical or poor and, e.g., countermeasures can be taken in time in order to prevent a permanent damage to the mechanical seal. Two different threshold values can also be provided, with the sliding condition of the seal being assessed as normal when the characteristic value does not exceed the first threshold value, being assessed as critical when the characteristic value lies between the first and the second threshold values, and being assessed as poor when the characteristic value exceeds the second threshold value.

It is also advantageous to evaluate the analog demodulated data or the corresponding digital data sets in the frequency domain or frequency space and to win therefrom at least one statistical characteristic value which is used for the assessment of the sliding condition of the seal. The transformation of the data from the time domain to the frequency domain can be done, for example, by means of a fast Fourier transformation (FFT). There are also a plurality of methods for the determination of one or more spectral characteristic values. Thus, for example, the frequency dependent signals can be analyzed in predeterminable frequency bands with respect to their maximum, averaged or total intensity or energy, and, for example, the total, the averaged or the maximum band energy or the maximum intensity in the frequency band can be used as spectral characteristic values. The above mentioned rotation signals can also be transformed into the frequency domain, from which so-called order spectra result. On the basis of these order spectra, for example, periodically arising signals can be distinguished from those which arise sporadically. Preferably, at least one statistical characteristic value and one spectral characteristic value and at least some of the operating parameters are used for the assessment of the sliding condition of the seal in order to further increase the reliability of the assessment. The assessment on the basis of the spectral characteristic values is done in a manner analogous to that done on the basis of the statistical characteristic values.

A further development of the method in accordance with the invention consists wherein at least one desired characteristic value $K_S$ for the sound emission of the seal, which takes the current operating state of the apparatus or the pump into consideration and is used for the assessment of the sliding condition of the seal, is determined by means of a model M (se FIG. 3) for which at least some of the operating parameters determined serve as input parameters $E_m$. In the following, for the sake of simplicity, and since it is sufficient for an understanding of the teaching, it will be assumed, in an exemplary manner, that the three operating parameters entry and exit temperature of the coolant and the speed of rotation are used as input parameters $E_m$ for the model M. With the help of the model M, the corresponding desired characteristic value $K_S$ is now calculated in each case for one or more predeterminable statistical and/or spectral characteristic values. The illustration in FIG. 3 is restricted for reasons of greater clarity to a single desired characteristic value $K_S$, which corresponds to a statistical or spectral characteristic value $K_M$ won from the acoustic signals. Naturally, corresponding desired characteristic values can also be calculated for the characteristic values won from the measurements with the help of the model M.

The desired characteristic value $K_S$ is a measure for that value which the statistical or spectral characteristic value $K_M$ should have if the mechanical seal is in the normal sliding condition for the current operating state. The difference $D = K_M - K_S$ between the statistical or spectral characteristic value $K_M$ and the desired characteristic value $K_S$ corresponding to it is preferably used as the criterion for the assessment of the sliding condition of the seal. If the seal is in the normal sliding condition, then this difference D is at least in the vicinity of zero. If the difference D exceeds a predeterminable threshold value, at least for one of the characteristic values, then the sliding condition of the seal is to be assessed as abnormal.

This threshold preferably has several levels. It is first tested in step 101 (FIG. 3) whether the difference D is less than a first threshold value S1 and greater than −S3, where S3 is a positive constant which serves as a threshold value for the validity of the model M. If so, the sliding condition is assessed as normal, as indicated in FIG. 3 by the box with the reference numeral 102. If on the other hand, the difference $D = K_M - K_S$ does not lie between −S3 and S1, then a check is made in step 103 whether the difference D is greater than S1 and less than a second threshold value S2. If this is the case, i.e. S1<D<S2, then a preliminary warning 104 results therefrom; the sliding condition is to be assessed as critical, but not yet as poor. A critical sliding condition of this kind can, for example, result from the fact that smaller particles break out of the surfaces of the seal which slide against one another or that the lubricant film has disturbances. If the difference D is also not less than the second threshold value S2, then it is checked in step 105 whether the difference D is greater than S2. If so, the sliding condition is to be assessed as poor (box 106 in FIG. 3) and countermeasures are as a rule necessary, e.g. increasing the cooling power via the coolant. If it turns out in step 105 that the difference D is not greater than S2, then the difference D is less than −S3. This is an indication that the model M is not of sufficient quality and must be corrected or determined anew (step 107).

It is advantageous, in particular, if the difference between the entry temperature and the exit temperature of the coolant enters into the model M for the determination of the desired characteristic value $K_S$, because this is a measure for the amount of heat produced by the surfaces of the seal as they slide against one another.

The model M for the determination of the desired characteristic value $K_S$ is preferably linear in the input parameters $E_m$ since this is particularly simple and nevertheless efficient. For the example mentioned above the desired characteristic value can then be calculated in accordance with an equation of the form $$K_s = \sum_i a_i \cdot T_i + b \cdot \omega,$$

with i being a running index which indexes the various temperatures $T_i$ which are measured as operating parameters, $\omega$ designating the speed of rotation and $a_i$ as well as b being model coefficients. Thus, in the concrete example, i=1 or 2, T1 is the entry temperature and T2 the exit temperature of the coolant. The model coefficients $a_i$ and b are determined in the normal sliding condition of the seal. This determination can take place, for example, when a new seal has been put into operation and the typical running in procedure has been completed. It is self evident that the model coefficients $a_i$ and b are adapted depending on the specific kind of the statistical or spectral characteristic value for which the desired characteristic value is to be determined.

Thus, for each of the statistical or spectral characteristic values determined from the acoustic signals, a corresponding desired characteristic value can be determined with the help of the model M which represents a reference which is representative for the normal sliding condition of the seal in the current operating state. This model M thus offers the great advantage that the limiting values, on the exceeding of which the sliding condition is to be assessed as critical or poor, are not rigid, but rather are matched to the respective current operating state of the apparatus or the pump via the desired characteristic values. A significant increase in the reliability of the assessment of the sliding condition of the seal results from this, in particular, under variable operating conditions.

It is self evident that yet further operating parameters, such as have been mentioned above, can also be used as input parameters $E_m$ for the model M. The model calculations can take place, for example, in the computation and evaluation device 50.

The assessment of the sliding condition of the seal carried out directly on the basis of the statistical or spectral characteristic values is preferably coupled with the assessment resulting from the model M in the sense of a logical OR operation, i.e. as soon as even one of these assessments identifies the sliding condition as critical or poor, then the total assessment of the sliding condition is also designated as critical or poor. This total assessment can be displayed by means of the output unit 60 (FIG. 2).

What is claimed is:

1. A method for monitoring the condition of a mechanical seal in an apparatus provided with a rotating part, in particular in a pump which has a rotating shaft for the forwarding of a fluid, in which method the sound emission of the seal in the operating state of the apparatus is continually measured in the form of analog acoustic signals at discrete times by means of a sound sensor, at least one statistical characteristic value is won from the acoustic signals and the statistical characteristic value is used for the assessment of the sliding condition of the seal, wherein the analog acoustic signals are converted prior to the determination of the statistical characteristic value into analog demodulated signals, the maximum frequency of which is less than about 50 kHz.

2. A method in accordance with claim 1, wherein the sound emission of the seal is measured in the frequency range from about 100 kHz to about one MHz.

3. A method in accordance with claim 1, wherein operating parameters are continually determined at discrete times by means of corresponding sensors, with at least the entry temperature of a coolant for the cooling of the seal as well as the speed of rotation of the rotating part of the apparatus, being measured as operating parameters, and with the operating parameters being at least partially used for the assessment of the sliding condition of the seal.

4. A method in accordance with claim 1, wherein the conversion of the analog acoustic signals into analog demodulated signals is performed by means of a peak value detector.

5. A method in accordance with claim 1, wherein at least one spectral characteristic value is won from the analog demodulated signals and wherein the spectral characteristic value is used for the assessment of the sliding condition of the seal.

6. A method in accordance with claim 1, with furthermore an exit temperature of a coolant for the cooling of the seal being measured as a further operating parameter and being used for the assessment of the sliding condition of the seal.

7. A method in accordance with claim 1, wherein, by means of a model for which at least some of the operating parameters determined serve as input parameters, at least one desired characteristic value for the sound emission of the seal is determined which takes account of the current operating state of the apparatus, and which is used for the assessment of the sliding condition of the seal.

8. A method in accordance with claim 7, wherein the difference between the statistical or spectral characteristic value and the desired characteristic value corresponding to it is used as a criterion for the assessment of the sliding condition of the seal.

9. A method in accordance with claim 7, wherein the difference between an entry temperature and an exit temperature of a coolant enter into the model for the determination of the desired characteristic value.

10. A method in accordance with claim 7, wherein the model for the determination of the desired characteristic value is linear in the input parameters.

11. A method in accordance with claim 1, wherein at least one of the following measurement values is also determined as an operating parameter: a temperature of a housing of the apparatus, a temperature of the fluid, power of the apparatus, the flow rate of the pump, the pressure in the fluid on a low pressure side and the pressure in the fluid on a high pressure side.

12. A method in accordance with claim 1 wherein the analog demodulated signals have a frequency of about 20 kHz.

* * * * *